(12) United States Patent
Sulemanji

(10) Patent No.: US 8,772,370 B1
(45) Date of Patent: Jul. 8, 2014

(54) ANTIFREEZE AGENT FOR TIRE SEALANTS

(71) Applicant: Illinois Tool Works Inc., Glenview, IL (US)

(72) Inventor: Shees N. Sulemanji, Grover Beach, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/804,242

(22) Filed: Mar. 14, 2013

(51) Int. Cl.
*B29C 73/00* (2006.01)

(52) U.S. Cl.
USPC .......................................................... 523/166

(58) Field of Classification Search
USPC ........................................................ 523/166
See application file for complete search history.

(56) References Cited

U.S. PATENT DOCUMENTS

| | | | |
|---|---|---|---|
| 2,357,650 A | 9/1944 | Hall | |
| 3,352,696 A | 11/1967 | Wallace | |
| 3,739,829 A | 6/1973 | Powell et al. | |
| 4,337,322 A | 6/1982 | Jaspon | |
| 4,501,825 A | 2/1985 | Magyar et al. | |
| 5,466,518 A | 11/1995 | Isaac et al. | |
| 5,856,376 A | 1/1999 | Wong | |
| 6,063,837 A | 5/2000 | Kawamura et al. | |
| 6,454,892 B1 | 9/2002 | Gerresheim et al. | |
| 6,818,596 B1 | 11/2004 | Hayes | |
| 6,840,990 B2 | 1/2005 | Gallagher et al. | |
| 6,864,305 B2 | 3/2005 | Kishida et al. | |
| 7,388,041 B2 | 6/2008 | Cegelski et al. | |
| 7,868,061 B2 | 1/2011 | Cegelski et al. | |
| 2004/0010059 A1 | 1/2004 | Kojima et al. | |

FOREIGN PATENT DOCUMENTS

| | | |
|---|---|---|
| DE | 198 44 177 B4 | 4/2000 |
| EP | 0 200 382 A2 | 12/1986 |
| EP | 0 200 382 B1 | 12/1986 |
| EP | 0 753 420 B1 | 1/1997 |
| EP | 0 846 552 A2 | 6/1998 |
| EP | 0 846 552 B1 | 6/1998 |
| EP | 0 972 616 B1 | 1/2000 |
| EP | 0 988 960 A2 | 3/2000 |
| EP | 1 372 941 B1 | 1/2004 |
| FR | 1.016.016 | 10/1952 |
| JP | 2003-82327 | 3/2003 |
| JP | 2003-193029 | 7/2003 |
| WO | WO 2006/058104 A2 | 6/2006 |
| WO | WO 2007/112010 A2 | 10/2007 |

*Primary Examiner* — Edward Cain
(74) *Attorney, Agent, or Firm* — Pauley Petersen & Erickson

(57) ABSTRACT

An environmentally safe, biodegradable aqueous antifreeze solution and a puncture sealing composition containing the same are provided. The antifreeze solution includes an antifreeze agent selected from trimethylglycine, dimethyl sulfoxide, and derivatives and combinations thereof. The composition is effective in forming and maintaining seals in tube and tire punctures.

20 Claims, No Drawings

ANTIFREEZE AGENT FOR TIRE SEALANTS

FIELD OF THE INVENTION

This invention is directed to an environmentally safe, biodegradable antifreeze agent useful for tube and tire sealants. The antifreeze agent is added to puncture sealing compositions for tire repair. The invention is also directed to a puncture sealing composition that includes the antifreeze agent.

BACKGROUND OF THE INVENTION

Conventional water-based antifreeze agents are typically aqueous mixtures of ethylene glycol and/or propylene glycol. Aqueous ethylene glycol mixtures are commonly used in automotive applications. Disadvantages of ethylene glycol include its toxicity and polluting characteristics. Propylene glycol is relatively nontoxic, but remains environmentally questionable due to its polluting characteristics. Another disadvantage of propylene glycol is that is viscosity increases significantly at lower temperatures, requiring higher pumping power.

U.S. Pat. Nos. 7,388,041 and 7,868,061 disclose a puncture sealing composition for tire repair that includes a rubber latex, an adhesive agent, and an antifreeze agent. The antifreeze agent is glycerin, potassium acetate, or a solution of glycerin and potassium acetate. While the antifreeze agent is an improvement over ethylene glycol and propylene glycol, there is room for further improvement.

There is a need or desire for an improved antifreeze agent that is environmentally safe, nonpolluting, biodegradable, and relatively easy to flow across a wide range of temperatures.

SUMMARY OF THE INVENTION

The invention is directed to a biodegradable, environmentally safe aqueous antifreeze solution and a puncture sealing composition that includes the antifreeze solution. The aqueous antifreeze solution includes an antifreeze agent selected trimethylglycine (also known as betaine) with or without glycerin, dimethyl sulfoxide or a derivative or combination thereof. The puncture sealing composition includes about 25-95% by weight of a rubber latex and about 5-75% by weight of the aqueous antifreeze solution, wherein the antifreeze agent includes trimethylglycine, dimethyl sulfoxide or a combination thereof. The puncture sealing agent can also include various surfactants that stabilize the rubber latex particles and prevent them from coalescing and agglomerating. The puncture sealing agent can also include one or more of an adhesive agent, fibers, a thickening agent, an antioxidant, a corrosion inhibitor, and other optional ingredients.

With the foregoing in mind, it is a feature and advantage of the invention to provide an improved antifreeze solution that is environmentally safe, nonpolluting, biodegradable, and relatively easy to flow across a wide range of temperatures.

It is also a feature and advantage of the invention to provide an improved puncture sealing composition that includes the antifreeze solution of the invention.

The foregoing and other features and advantages of the invention will become further apparent from the following detailed description of the presently preferred embodiments.

DETAILED DESCRIPTION OF THE PRESENTLY PREFERRED EMBODIMENTS

The biodegradable, environmentally safe antifreeze solution includes an antifreeze agent selected from trimethylglycine (betaine), dimethyl sulfoxide or a derivative or combination thereof. Suitably, the antifreeze agent includes trimethylglycine, or a derivative or combination thereof. Even more suitably, the antifreeze agent includes trimethylglycine or a combination thereof. The antifreeze solution also includes water and can also include a known antifreeze ingredient such as glycerin. When a known antifreeze ingredient is used, the weight of the known antifreeze ingredient (e.g. glycerin) suitably does not exceed the combined weight of trimethylglycine and/or dimethyl sulfoxide.

Trimethylglycine (betaine) is a nontoxic and odorless material present in nature that biodegrades in nature to the extent of about 80% after 20 days. Trimethylglycine can be present in nature and can be prepared by extraction from plants such as sugar beets, or by a biochemical process. Trimethylglycine lowers the freezing point of water in similar fashion to ethylene glycol or propylene glycol. Trimethylglycine, like ethylene or propylene glycol, disrupts the freezing point of water by blocking the formation of hydrogen bonds that lead to the unique crystal structure found in ice. Table 1 compares the freezing point of aqueous antifreeze solutions at various concentrations of trimethylglycine or glycol.

TABLE 1

Freezing Points Of Aqueous Antifreeze Solutions

| % By Weight | Freezing Point, °C. | | |
|---|---|---|---|
| Trimethylglycine or Glycol In Water | Trimethylglycine | Ethylene Glycol | Propylene Glycol |
| 20 | −5 | −8 | −7 |
| 25 | −7 | −11 | −10 |
| 30 | −9 | −14 | −13 |
| 35 | −14 | −18 | −16 |
| 40 | −19 | −22 | −21 |
| 45 | −26 | −28 | −27 |
| 50 | −35 | −34 | −34 |
| 55 | −45 | −41 | −51 |
| 60 | −57 | NM | NM |

If the water content does not exceed 50%, trimethylglycine can be used at temperatures between −35° C. and 100° C. (the boiling point of water). If the water content does not exceed 45%, the trimethylglycine can be used at temperatures from −45° C. to 100° C. If the water content does not exceed 40%, trimethylglycine can be used at temperatures below −50° C. When trimethylglycine is used as the antifreeze agent, the water content of the antifreeze solution is suitably about 25% to about 60%, more suitably about 30% to about 50%, or about 35% to about 40%. The balance of the solution can be trimethylglycine or a combination thereof. One suitable combination includes equal amounts of trimethylglycine and glycerin.

Dimethyl sulfoxide, when mixed in a solution of 40% water, remains unfrozen at −60° C. and has similar freezing suppression properties as trimethylglycine. For this reason, the suitable ranges of water and antifreeze agent in an aqueous dimethyl sulfoxide solution are generally the same as for trimethylglycine, as stated above. The flow of both trimethylglycine and dimethyl sulfoxide solutions at very low temperatures (below −40° C.) is better than for the glycol solutions.

The aqueous antifreeze solution can also include a conventional antifreeze agent, for example, glycerin, in an amount that does not exceed the weight of trimethylglycine, dimethyl sulfoxide, or combination thereof. If a higher amount of conventional antifreeze agent is used, then the inclusion of a conventional antifreeze agent is optional and is not a required component of the invention.

The puncture sealing composition includes about 5-75% by weight of the aqueous antifreeze agent, suitably about 25-60% by weight, or about 30-50% by weight. The puncture sealing composition also contains about 25-95% by weight of a rubber latex (which can be natural or synthetic), suitably about 25-60% by weight, or about 30-50% by weight. The rubber latex can be a deprotein natural rubber latex, which is obtained by removing proteins from the natural rubber latex and is less corrosive because it releases less ammonia. The protein content in ordinary natural rubber latex is about 0.2-0.3% by weight based on nitrogen content, and can be reduced to 0.1% by weight or less. The rubber latex can also be a synthetic rubber latex or a combination of natural and synthetic rubber latexes. They synthetic rubber latex can be a styrene-butadiene rubber, an acrylonitrile-butadiene rubber, an ethylene-vinyl acetate rubber, a chloroprene rubber, a vinylpyridine rubber, a butyl rubber, a polyurethane latex, an acrylic latex, or a combination thereof. If the content of the rubber latex falls below about 25% by weight, then the puncture sealing composition may be less effective in forming and maintaining a seal in the tire puncture.

The puncture sealing composition may also include an adhesive in an amount of about 5 to about 30% by weight, suitably about 10 to about 25% by weight. The adhesive should be one which does not cause aggregation of the rubber latex particles. Suitable adhesives include terpene resins, phenolic resins and combinations thereof. Other suitable adhesives include polyvinyl esters, polyvinyl alcohol, polyvinyl pyrrolidine, and combinations thereof. If the amount of adhesive is less than about 5% by weight or more than about 30% by weight, then the ability of the puncture sealing composition to form and maintain a seal in the tire puncture can be lowered. On the other hand, the puncture sealing composition can be formed without an adhesive if the adhesive interferes with the stability of the rubber latex.

The puncture sealing composition can also include fibers that improve the sealing properties. When used, the fibers can have a diameter of about 1 to about 150 microns and can be formed of a stable, chemically inert polymeric material such as nylon, rayon, polyester, polypropylene, or the like. The fibers may constitute about 1 to about 20% by weight, suitably about 2 to about 15% by weight of the puncture sealing composition.

The puncture sealing composition can also include a surfactant that stabilizes the rubber latex particles and inhibits coagulation and agglomeration. When used, the surfactant can be anionic, ampholytic, or a carboxylic acid type surfactant, and can be present in an amount of about 0.2% to about 6.0%, suitably about 0.4% to about 2.0% by weight. An aliphatic acid salt having 9 to 18 carbon atoms may be used as the surfactant agent since the salt exhibits the effect of suppressing coagulation in bulb cores without lowering the sealing ability of the puncture sealing composition. Several examples of the aliphatic acid in the aliphatic acid salt having 9 to 18 carbon atoms may include capric acid having 10 carbon atoms, lauric acid having 12 carbon atoms, myristic acid having 14 carbon atoms, palmitic acid having 16 carbon atoms, and stearic acid, oleic acid and linoleic acid having 18 carbon atoms. Several examples of the salt may include sodium salt, potassium salt, ammonium salt and triethanolamine salt.

For the surfactant agent, ammonium laurate and triethanolamine laurate are particularly suitable since they exhibit superior coagulation-suppressing effects in proportion to the content thereof. Ammonium laurate or triethanolamine laurate may also be mixed with a second surfactant agent. In this case, the second surfactant agent is suitably a surfactant made of an aliphatic acid salt having 9 to 18 carbon atoms. Ammonium laurate has an ammonia odor so that triethanolamine laurate is suitably used.

The puncture sealing composition may optionally include an antioxidant and/or a thinning agent. The antioxidant agent protects against the effects of heat, light, and oxidation that may occur over time. A phenolic type antioxidant is preferred. An exemplary antioxidant would be Akrosperse W-2294 made by Akrochem Chemical in Ohio. The puncture sealing agent may also optionally include rust and corrosion inhibitors and biocides. 2-mecaptobenzothiazol is an exemplary inhibitor that may be used. Grotan is an exemplary biocide that may be used. Any inhibitor or biocide that a person of ordinary skill in the art deems suitable may be used for the puncture sealing composition.

An optional thickening agent may be included in those embodiments of the puncture sealing composition that have a relatively high liquid content and a relatively low solids content. Suitable thickening agents include clays such as bentonite clay, attapulgite clay, or hectorite clay. Other suitable thickening agents include cellulose thickeners such as hydroxyethyl cellulose, hydroxypropyl cellulose, carboxymethyl cellulose and derivatives thereof. Other suitable thickening agents include natural gums such as xantham gum or guar gum. Other suitable thickening agents include hydrophobic alkali swellable emulsions, sometimes called Hase-type thickeners. The thickening agent may constitute about 0.1 to about 15% by weight of the puncture sealing composition, suitably about 2 to about 10% by weight. Thickening agents are often not used due to their tendency to undesirably increase the viscosity of the puncture sealing composition at low temperatures.

The puncture sealing composition can be prepared using any suitable technique. One particularly suitable technique is described in U.S. Pat. Nos. 7,338,041 and 7,868,061, the disclosures of which are incorporated by reference. Briefly, the rubber latex is mixed with an adhesive and other optional ingredients while stirring to form a mixture. The aqueous antifreeze solution is prepared separately. Then, the aqueous antifreeze solution is added to the mixture while stirring to form the puncture sealing composition. The aqueous antifreeze solution may include trimethylglycine, dimethyl sulfoxide, or any of the above-described derivatives and combinations of these ingredients.

The embodiments of the invention described herein are presently preferred. Various modifications and improvements can be made without departing from the spirit and scope of the invention. The scope of the invention is indicated by the appended claims, and all variations that fall within the meaning and range of equivalents are intended to be embraced therein.

I claim:

1. A puncture sealing composition, comprising:
   rubber latex particles; and
   about 5% to about 75% by weight of an aqueous antifreeze solution;
   wherein the aqueous antifreeze solution includes about 25% to about 60% by weight water and about 40% to about 65% by weight of an antifreeze agent selected from the group consisting of trimethylglycine, dimethyl sulfoxide, and combinations thereof.

2. The puncture sealing composition of claim 1, wherein the antifreeze agent is selected from the group consisting of trimethylglycine and combinations thereof.

3. The puncture sealing composition of claim 2, wherein the antifreeze agent comprises trimethylglycine.

4. The puncture sealing composition of claim 3, wherein the antifreeze solution further comprises glycerin.

5. The puncture sealing composition of claim 4, wherein the glycerin is present in an amount not exceeding the amount of trimethylglycine.

6. The puncture sealing composition of claim 1, wherein the antifreeze agent is selected from the group consisting of dimethyl sulfoxide and combinations thereof.

7. The puncture sealing composition of claim 1, wherein the rubber latex is present at about 25% to about 60% by weight.

8. The puncture sealing composition of claim 1, further comprising about 5% to about 30% by weight of an adhesive selected from the group consisting of terpene resins, phenolic resins, polyvinyl esters, polyvinyl alcohol, polyvinyl pyrrolidine, and combinations thereof.

9. The puncture sealing composition of claim 1, further comprising about 2% to about 15% by weight fibers.

10. A puncture sealing composition, comprising:
    rubber latex; and
    about 5% to about 75% of an aqueous antifreeze solution including water and an antifreeze agent selected from the group consisting of trimethylglycine, dimethyl sulfoxide, and combinations thereof.

11. The puncture sealing composition of claim 10, wherein the antifreeze agent comprises trimethylglycine in an amount of about 40% to about 60% by weight of the aqueous antifreeze solution.

12. The puncture sealing composition of claim 10, wherein the antifreeze agent comprises a mixture of trimethylglycine and glycerin in a combined amount of about 40% to about 75% by weight of the aqueous antifreeze solution.

13. The puncture sealing composition of claim 10, wherein the antifreeze agent comprises dimethyl sulfoxide in an amount of about 40% to about 75% by weight of the aqueous antifreeze solution.

14. The puncture sealing composition of claim 10, comprising about 25% to about 60% by weight of the aqueous antifreeze solution.

15. The puncture sealing composition of claim 10, further comprising about 5% to about 30% by weight of an adhesive.

16. The puncture sealing composition of claim 10, further comprising about 1% to about 20% by weight fibers.

17. The puncture sealing composition of claim 10, wherein the rubber latex is selected from the group consisting of natural rubber latex, styrene-butadiene rubber, acrylonitrile-butadiene rubber, ethylene-vinyl acetate rubber, chloroprene rubber, vinyl pyridine rubber, butyl rubber, polyurethane latex, acrylic latex, and combinations thereof.

18. A method of making a puncture sealing composition, comprising the steps of:
    mixing rubber latex with an adhesive while stirring, to form a mixture;
    separately preparing an aqueous antifreeze solution including an antifreeze agent selected from the group consisting of trimethylglycine, dimethyl sulfoxide and combinations thereof; and
    adding the aqueous antifreeze agent to the mixture while stirring.

19. The method of claim 18, wherein the antifreeze agent comprises trimethylglycine.

20. The method of claim 18, wherein the antifreeze agent comprises dimethyl sulfoxide.

\* \* \* \* \*